UNITED STATES PATENT OFFICE.

PINCUS BRAUNER AND LOUIS W. ROSEN, OF NEW YORK, N. Y., ASSIGNORS TO ADOLPH E. BRION, OF NEW YORK, N. Y.

FILM-SHIFTING DEVICE FOR CAMERAS.

1,253,205.      Specification of Letters Patent.      Patented Jan. 15, 1918.

Application filed February 8, 1915. Serial No. 6,680.

*To all whom it may concern:*

Be it known that we, PINCUS BRAUNER and LOUIS W. ROSEN, citizens of the United States, and residents of the city, county, and State of New York, have invented a new and useful Improvement in Film-Shifting Devices for Cameras, of which the following is a specification.

The object of our invention is to provide a device of this class in which the film may be shifted automatically, either by the release mechanism which operates the shutter, or otherwise as desired, so that when once the camera is loaded and set, the photographer may thereafter take his pictures of any desired exposure to the limit of the film without touching the winding mechanism and by simply operating the release mechanism which actuates the shutter, or, if desired, the apparatus may be slightly changed and the film may be shifted by means of the door or cover for the autograph attachment. If, for any reason, the film shifting mechanism should get out of order or become inoperative, or its use be not desired, this film shifting mechanism may be disconnected and the winding of the film continued by hand, as in an ordinary camera. These, and other objects are accomplished by our invention, some embodiments of which are hereinafter set forth.

For a more particular description of our invention, reference is to be had to the accompanying drawings, forming a part hereof, in which—

Figure 1:
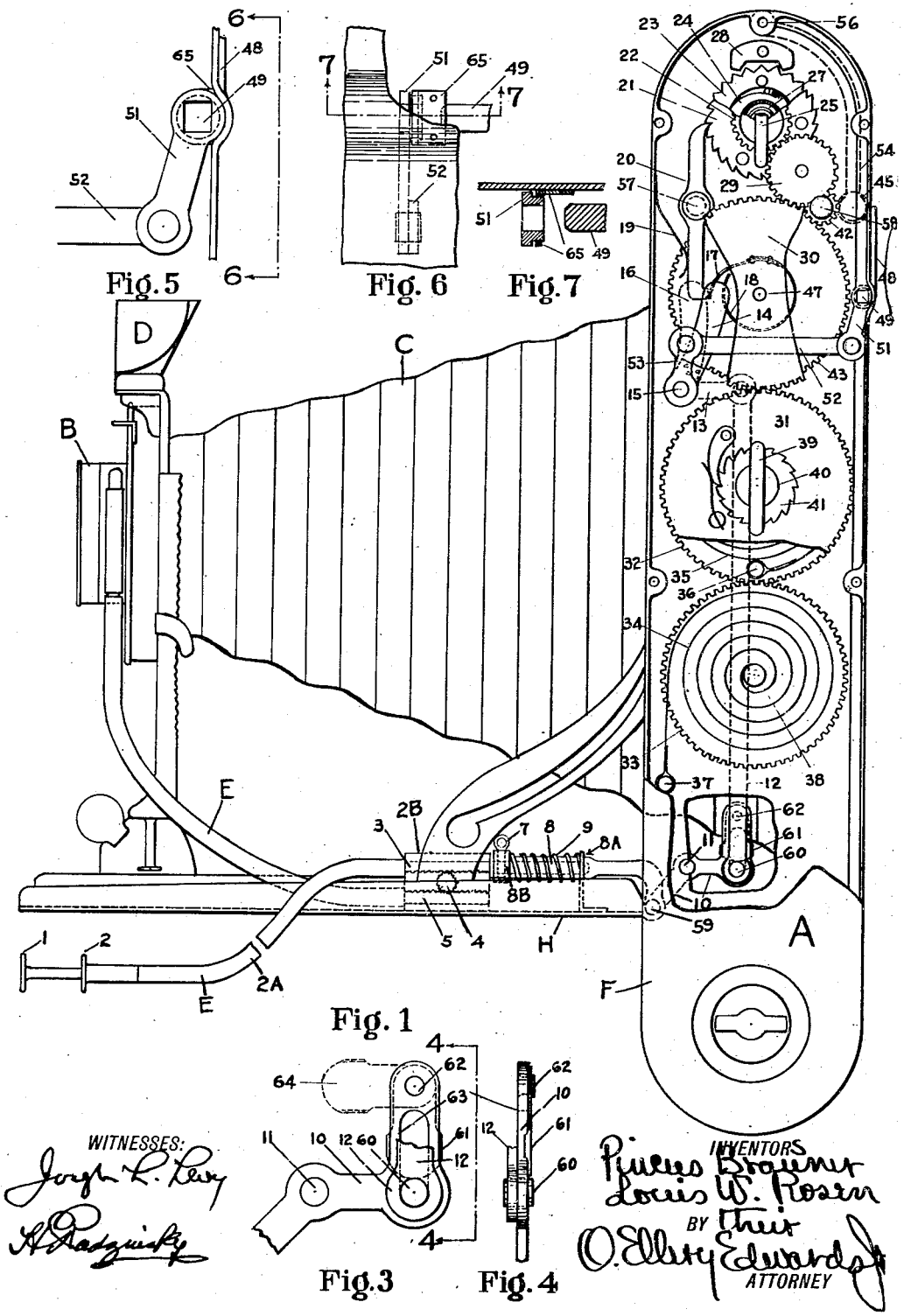
Figure 1 is a side elevation of our improved camera with parts broken away to reveal the structure.

The remaining figures show details, Figs. 3 and 4 showing part of the release mechanism which operates only when the shutter mechanism is used, and Figs. 5, 6 and 7 showing mechanism connected with the door of the autograph attachment, Fig. 4 being taken substantially along the line 4—4 adjacent to Fig. 3, looking in the direction of the arrows, Fig. 6 along the line 6—6 adjacent to Fig. 5, looking in the direction of the arrows, and Fig. 7 along the line 7—7 of Fig. 6, looking in the direction of the arrows.

Throughout the various views of the drawings, similar reference characters designate similar parts.

A indicates a camera of the conventional form provided with the usual lens and shutter mechanism B, bellows C, finder D and release mechanism E for actuating the shutter B. There are other and incidental parts generally found in cameras of this character which it is not necessary to mention specifically. It is sufficient to say that the sides F and G of our improved camera are preferably made of hollow metal instead of wood, and the side F is provided with a suitable train of gears which will be described below, springs, etc., by which the film shifting mechanism is actuated and stopped according to the operation of the controlling mechanism which is also described below.

The release mechanism E for operating the shutter B has a conventional plunger 1 operating in a suitable bushing 2 at the end of a tube 2ª which tube runs to a suitable casing 2ᵇ wherein runs a plunger with a rack 3 which meshes with a suitable gear 4 which drives a second rack 5 which is also mounted in the casing 2ᵇ, and this rack has a suitable plunger by means of which the shutter B is operated, in the conventional manner.

The rack 3 which is mounted in the casing 2ᵇ near its upper edge projects from this casing and runs against a cotter 7, or other obstruction, removably mounted in a hollow rod or stem 8 supported in a suitable bracket 8ª, which runs upwardly from the front door H of the camera. The cotter 7 is preferably mounted in a collar, as shown, although it may be mounted in any suitable way. Between this collar 8ᵇ and the bracket 8ª is placed a coil spring 9 by means of which the tube 8 is normally kept projected near the rack 3. By removing the cotter 7, as is obvious, this rack 3 will run into the hollow stem 8 and not shift the stem, and by leaving this cotter in place, as shown, when the rack 3 is projected, it will shift the stem 8 against the action of the spring 9. The hollow stem 8 is bent downwardly at its rear end where it is connected with a bell crank lever 10, as shown, the pivot 59 connecting these parts being in actual alinement with the pivot of the front door H of the camera so as to permit the opening or closing of this front door H without any further adjustment for that purpose. The bell crank lever 10 is suitably fulcrumed at 11 and provided with an upward extension in which is a slot 63 in which runs a suitable pin 60 secured in the lower end of a link 12 which runs upwardly to a lever 13 fixed on a pivot 15 which is suitably mounted in the side F, as shown. If, for any reason, it is desired that the pin 60 should not move in the slot 63, it is so prevented from moving by means of a detent 61 which is swung into the positions shown in full lines in Figs. 3 and 4, where its sides project against the sides of the extension on the lever 10 and prevent the pin 60 from rising in the slot. By throwing the part 61 into the position shown at 64 in Fig. 3, the detent is rendered inoperative permitting the link 12 to rise from the upward extension of the lever 10 by reason of the unobstructed slot under the substituted action of the opening of the autograph door and free from any action of the spring 9 and actual engagement with the lever 10. Under normal conditions when not using the autograph door, the detent 61 is in the position shown in full lines in all the views where it appears.

The upper end of the link 12 is pivotally connected to the lever 13, as above stated, and this is fixed to the pivot 15 which also is secured to a flat spring 14 extending substantially as shown against the edge of a cam 18, which will be described below. When the link 12 is raised by the action of the bell crank lever 10 so that the free end of the lever 13 is raised so as to rotate the pivot 15, the spring 14 is thrown into the position indicated in dotted lines at 16 and then rests, not on or against the top edge or side of the cam 18, but against the spring 17 on this cam, and in a position to compress the spring against the cylindrical face of this cam 18 as will appear below. The raising of the link 12, when the apparatus is used as above described, is but momentary, and as soon as the spring 14 is thrown to the position indicated by dotted lines at 16 in Fig. 1, and the rack 3 is withdrawn from contact with the cotter 7 by removing the hand pressure from the plunger 1, then, under the influence of the spring 9, the hollow stem 8 is withdrawn, thereby causing the spring 14 to press against the spring 17. As the spring 9 is much stronger than the spring 17, this spring 17 is mashed down against the cylindrical face of the cam 18. The spring 17 normally rests against the dog 20 pivoted at 57, and the lower end of this dog is kept against the spring 17 by means of a suitable leaf spring 19 secured to the interior of the side F. The upper end of the dog 20 engages a suitable ratchet wheel 21 which is mounted so as to turn on the hollow spindle 24, to which spindle one end of a winding spool is secured in the conventional manner, by means of the shaft 26 connected with the spindle and running through its hollow center. Fixed to the ratchet 21 and turning on the same shaft with the same annular velocity as the ratchet 21 is a spur gear 22 and an escapement wheel 23 which is adapted to coöperate with a double pawl or escapement 28 pivoted near the top of the part F. The shaft or spindle 24 is provided at one end with suitable ratchet teeth or cams which are adapted to engage rollers that run on the interior of the escapement wheel 23, so that when desired the shaft or spindle 24 may be turned by means of a handle 25 in the conventional manner without causing any movement of the escapement wheel 23, ratchet wheel 21 or gear 22, and on the other hand the rotation of the escapement wheel in a counter clock-like direction will cause a corresponding rotation of the shaft 24. The handle 25 is connected with the spindle 24 and to a small shaft 26 in the conventional manner, and about this shaft 26 is placed a coil spring 27 which causes a suitable projection to enter into a corresponding recess in the spool so that the spool may turn in the usual way when the shaft 24 rotates, or the shaft 26 may be withdrawn from the spool in the usual way, when the spool is inserted or removed.

The escapement 28 prevents an excessive speed when the shaft or spindle 24 rotates by acting as a brake or a retarder.

The cam 18 has a suitable slot 44, as shown, by virtue of which the spring 14 may be raised clear of the spring 17 and placed on the top edge of the cam 18 so that when the apparatus again operates, as above described, the spring 14 will again be able to get on the spring 17 and compress the same under the action of the spring 9.

The mechanism for driving the gear 22 will now be described. The gear 22 meshes with a pinion 29 which is suitably mounted on any shaft and preferably fixed thereto, and the shaft is journaled in the housing F, and this pinion 29 meshes with a gear 30 mounted in a similar manner, except that it runs loose on the shaft 47 which carries the rotary cam 18. The gear 30 meshes with a suitable gear 31 mounted on an arbor 40 to which arbor is secured one end of a main spring 35, together with a suitable pawl and ratchet 41, and this spring 35 may be wound by means of a handle 39 mounted on the arbor 40, which handle 39, like the handle 25, may be folded into a suitable recess in a wall of the part F. The arbor 40 also carries loose a gear 32 to which gear the other end of the main spring 35 is secured and which meshes with a corresponding gear 33 secured on a suitable arbor 38, and to this arbor 38 is secured one end of a spring 34, the other end of which is secured to a bar or pin 37 in the side F. While only two springs 34 and 35 are shown, it is obvious that as many more may be employed, in the manner they are connected, as may be found desirable; or if desired, only one spring may be employed, the number of springs employed will depend upon the size of the camera, length of film and the resistance encountered when winding a film from one spool to another.

It is obvious from what has been said that the springs 34 and 35 act together so that when one is wound both are wound, and that when one is unwound both are unwound. These springs are governed in their unwinding by mechanism which will now be described.

Figure 2:
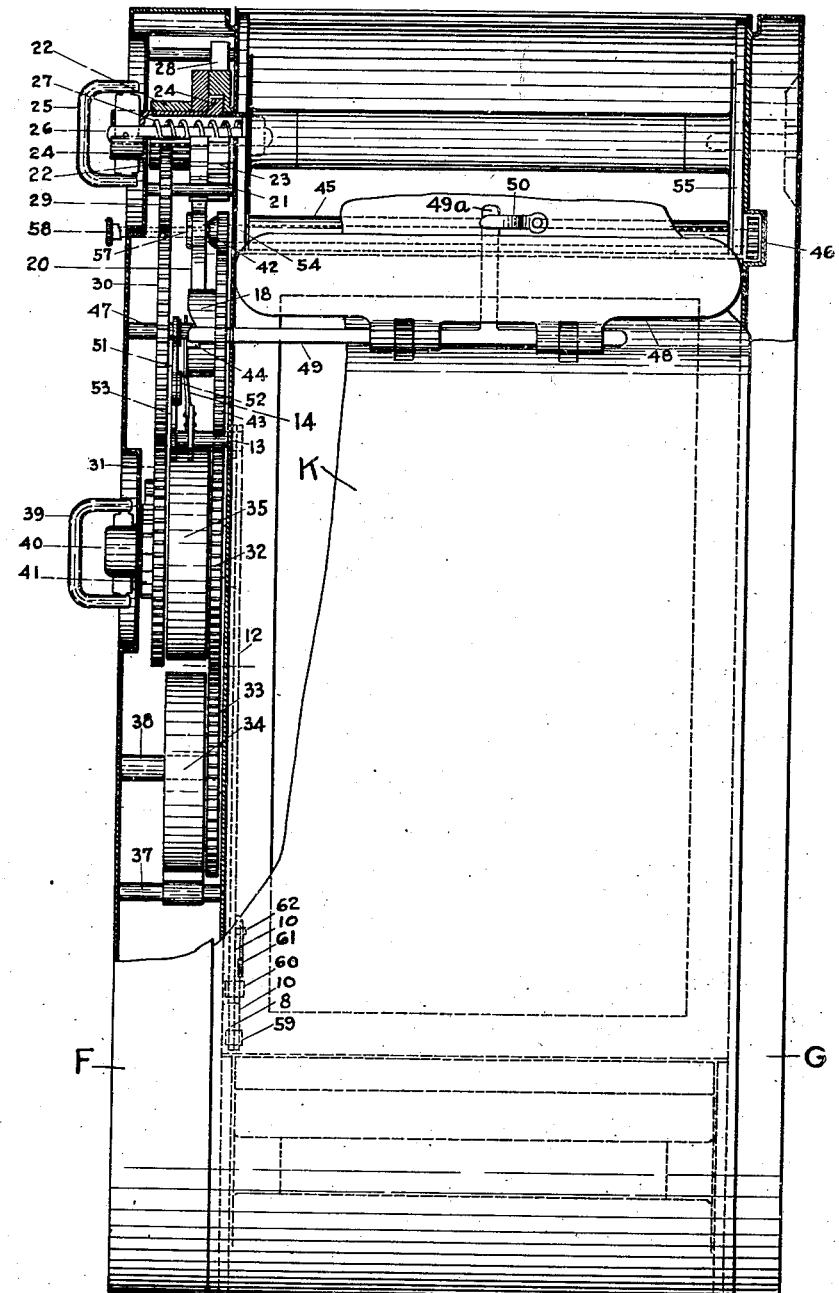
Fig. 2 is a rear elevation of the same, the view being taken at right angles to that shown in Fig. 1.

The rotary cam 18 is fixed to a suitable gear 43 which turns with the shaft 47 and meshes with a small gear 42 at the end of a roller which is made to rotate with another roller 45 whenever a handle 58 so permits. This handle 58 is on the end of a bar which is connected to a clutch or other mechanism, not shown, whereby the gear 42 may be connected or disconnected to and from the roller to which it is attached, or from the gear 43 while in mesh with it. The disconnection of this gear 42 by the handle 58 is made before it is desired to wind the film by hand as aforesaid, so as to allow the measuring rollers between which the film passes to revolve as usual, thus not only preventing interference with the automatic mechanism but avoiding injury to these rollers and the film as otherwise the former would be held from turning with the latter in their grip. There are two rollers, 45 and the one attached to the gear 42, parallel to each other and provided with meshing gears 46 placed in a suitable recess in the side G so that these rollers may be made to rotate together. The roller 45 is preferably mounted by means of the arms 54 and 55 which are pivoted by pins 56 attached to the sides F and G of the camera. These arms allow a clear separation of said rollers to facilitate the insertion of the film, after which insertion the roller 45 is brought into contact with its companion roller and with the film resting in between them. In this last position, as shown in Figs. 1 and 2, the arms 54 and 55, which are preferably made of resilient metal, are adapted to be depressed by the inside wall of the back cover of the camera as soon as the cover is replaced, as customarily, before taking a picture. This depression of the arms insures a gripping of the film by the rollers, while their resiliency makes allowance for slight variations in thickness of the film.

The above described apparatus is suitable where the film is to be shifted by the release apparatus which actuates the shutter, immediately after the closing of which, after the exposure has been completed, the film is advanced. This is one way of operating the device. Another is to utilize the cover of the autograph apparatus so that the last exposed picture will be kept from advancing until the desired inscription upon it, normally made after the exposure has been completed, has been inserted, and the additional structure for this kind of operation will now be described, as well as the changes incidental thereto.

The above described apparatus is changed when the cover mechanism is used by first removing the cotter pin 7 and then shifting the detent 61 to the position shown in dotted lines at 64 in Fig. 3. This renders inoperative the slide or stem 8 with the spring 9, and bell crank lever 10, and the link 12 and lever 13 also become inoperative.

The autograph attachment cover 48 is mounted so as to hinge on a bolt 49 which is provided with an extension 49$^a$ which is adapted to take under a detent 50 fixed to the cover 54. The bolt 49 may be shifted and must be shifted before the cover 48 is opened so as to engage the film shifting apparatus. When shifted it has a square end which projects into the fulcrum of a lever 51 which lever is mounted to turn in a bearing 65 secured to the end F in any suitable manner. The lever 51 is pivotally connected to a link 52 which has a second pivoted connection to a lever 53 fixed to the shaft 15 so that when the cover 48 is opened the shaft is turned so as to throw the spring 14 into the position shown at 16 where it remains inoperative until the cover is closed when, by virtue of the closing, the spring 14 presses the spring 17 against the cam 18, as above described. From this it is apparent that the film is shifted after the cover 48 is closed. The bolt 49 is then withdrawn with its projection 49$^a$ which is secured under the detent 50. By turning the detent 50 on its pivot, the projection 49$^a$ is inoperative, and then the door 48 may be opened without regard to the film shifting device.

In view of the foregoing, the operation of our improved device will be readily understood. Assuming that it is the desire of the photographer to take pictures and shift the film automatically with the apparatus in the condition first described, the pohtographer removes the old film in the camera in the conventional way, if the camera is not already empty. He then proceeds to insert a new film in the conventional manner, however, first separating the roller 45 from the roller on the gear 42 by means of the arms 54 and 55 to facilitate the insertion of the film between the rollers. He also disconnects the gear 42 from the gear 43, or else disconnects the gear 42 from the roller on which it is secured, according to the nature of the structure used, by means of the handle 58. He then proceeds to wind the paper and film with the handle 25, in the conventional manner after having brought back the roller 45 in contact with the opposite roller, and continues to do so until the indicator on the camera shows that the first film is in place. He then shifts the handle 58 so that the gear 42 is properly in mesh with the wheel 43, or else secured to the roller to which it is attached, as above set forth, and the spring 17 is in position shown in Fig. 1. He then proceeds to take his pictures in the ordinary way by pressing the plunger 1 after he has the camera in proper focus, etc. As there is lost motion between the spring 14 in position 16 and the same spring in the position it thereafter occupies while mashed down against the spring 17, the shutter B acts before the spring 17 is compressed and the dog 20 released and so completes the exposure. When the rack 3 reaches the cotter 7, the stem 8 is shifted and that shifts the lever 10, which raises the link 12 so as to shift the lever 13 which turns the pivot 15 and thereby puts the spring 14 into position 16, as above described. As the rack 3 flies back the tension of the spring 9 causes the spring 14 to compress the spring 17 and the pawl 20 follows because of the pressure of the leaf spring 19 at its lower end. This releases the ratchet 21 which immediately revolves under the influence of the springs 35 and 34 and the gearing incidental thereto, this movement of the ratchet 21 being checked by the double pawl or escapement 28, as above described. This movement draws the film, as above described, between the rollers 45 and the one attached to the gear 42 which causes the gear 42 to rotate, and this rotates the gear 43 in a clock-like direction. While the gear 43 is so rotating the spring 17 fastened to the cam attached to this gear moves away from the pressure of the spring 14, the latter of which then presses against the cylindrical face of the cam 18 until it enters the recess 44 of this cam when it immediately leaves the same and rides upon the top edge of the cam, finally taking its original position on a part of said edge and above the level of the spring 17, synchronously at which time the spring 17 forces the pawl 20 into engagement with the ratchet 21, when the shifting of the film is abruptly stopped. The proportions are such that this stoppage takes place when a part of the film sufficient for one exposure has shifted and neither more nor less movement of the film has taken place. The camera is then ready for another picture which is taken the same as before and the cycle above set forth is repeated until the film is exhausted. If desired, the cotter 7 may be withdrawn altogether so that the film shifting apparatus is no longer responsive to the button 1. This must be done in order to operate this apparatus by means of the autograph door 48, as above described, but in that event the detent 61 should be shifted to the position shown in dotted lines in Fig. 3. In the use of the autograph door the bolt 49 enters the lever 51 causing it to shift so as to start the rotation of the cam 18, as above set forth. In this event the apparatus for shifting the film is actuated by the cover 48 of the autograph attachment upon the closing of this cover and not otherwise. By turning the clip 50 about its pivot the film shifting apparatus by way of the autograph door is no longer responsive, due to the unnecessary shifting of the bolt 49 into the lever 51 in order to clear the projection 49$^a$ of the clip 50.

While we have shown and described one embodiment of our invention, it is obvious that it is not restricted thereto but is broad enough to cover all structures that come within the scope of the annexed claims.

Having thus described our invention, what we claim is:

1. In a device of the class described, independently adjusted means for permitting a film to be received and carried so that any sufficient area of it can be positioned in the field of exposure, means for taking a picture on said film, mechanism connected with said picture taking means for shifting this film after a picture has been taken, and mechanism, positively gripping a film, for measuring predetermined, uniform lengths of it, mechanism connected thereto for positively stopping the shifting mechanism after each length is determined, and means for releasing this positively gripping mechanism when a film is inserted or removed from the device.

2. In a device of the class described, means for taking a picture on a film, automatic mechanism connected therewith for shifting this film after a picture has been taken, mechanism for positively gripping and measuring predetermined, uniform lengths of film, automatic means connected thereto for stopping this automatic shifting mechanism after a predetermined length has been measured and means for releasing this positively gripping mechanism when a film is inserted or removed from the device.

3. In a device of the class described, means for taking a picture on a film, measuring rollers positively gripping said film, adapted to measure predetermined, uniform lengths of it and between which it passes and which are driven by it, a gear secured to one of said rollers, mechanism connected with this picture taking means for causing the film to pass over said roller after a picture is taken, mechanism meshing with said gear for causing the film shifting mechanism to stop after each length is determined and means for releasing these measuring rollers when a film is inserted or removed from the device.

4. In a device of the class described, means for taking a picture on a film, a strong spring and means actuated thereby to shift this film, positively acting means for checking the speed of said film shifting mechanism, and means for stopping this film shifting mechanism after a predetermined and uniform length of film has been shifted by the same.

5. In a device of the class described, a roller over which a film passes while driving the same, a pinion secured to said roller, a gear meshing with said pinion, a cam secured to said gear and a spring projecting from said cam.

6. In a device of the class described, a roller over which a film is passed, and means for mounting said roller, a pinion secured to said roller, a gear meshing with said pinion, a cam secured to said gear, a spring secured to said cam, film shifting mechanism, and a pawl connecting said spring and film shifting mechanism so that said spring forces said pawl to stop said mechanism.

7. In a device of the class described, a roller over which a film is adapted to pass and means for mounting the same, a pinion secured to said roller, a gear meshing with said pinion, a cam secured to said gear having a recess on its edge, a spring adapted to rest in said recess or elsewhere on said edge, a second spring secured to said cam, and mechanism for causing said first mentioned spring to press against said second mentioned spring.

8. In a device of the class described, two co-acting measuring rollers adapted to revolve a peripheral distance equal to the length of a film passing between them, mechanism for shifting the film automatically, mechanism for shifting the film by hand, and connections between the automatic mechanism and the hand mechanism whereby one may be operated without interfering with the other or with the normal revolution of said rollers when the film passes between them.

9. In a device of the class described, a shutter mechanism, mechanism for starting a film, said mechanism containing a cam, a spring rubbing against the edge of said cam, a second spring carried by said cam, a lever for shifting said first mentioned spring and means connected with the shutter mechanism for operating said lever.

10. In a device of the class described, mechanism for shifting a camera film, containing in its construction a cam, a spring pivotally mounted and adapted to engage an edge of said cam, a second spring fixed to the face of said cam and adapted to be engaged at times by said first mentioned spring, a lever adapted to operate to shift said first mentioned spring, an autograph cover, means connecting the said lever with the autograph cover so that the lever will operate to shift the first mentioned spring to press the second mentioned spring only when the cover is closed, and not otherwise.

11. In a device of the class described, a camera with means for taking a picture on a film, an automatic film shifting means mounted therein, a measuring device which positively grips the film for measuring a predetermined and uniform length of it, means connected therewith for stopping the film shifting means after each length is determined and means for releasing this measuring device when a film is inserted or removed from the device.

12. In a device of the class described, a camera having a shutter and mechanism for actuating the same, a film shifting device, measuring rollers which positively grip a film, and stopping means connected with the rollers so that the film shifting mechanism will be forced to stop by this mechanism after a predetermined, uniform length of film has been measured, means connected to the shutter and film shifting device for first actuating the shutter and thereafter causing the film shifting mechanism to act and means for releasing this measuring device when a film is inserted or removed from the device.

13. In a device of the class described, a casing, a front door with a suitable hinge and connecting the door and casing, a bellows supported from said door at its front end, film shifting mechanism and a stem connected to said film shifting mechanism with a pivotal connection, said stem being bent so as to have said pivotal connection in the axis of said hinge.

14. In a device of the class described, means for taking a picture on a film, and a mechanism connected therewith for shifting and measuring this film, said mechanism including a plurality of springs and gears, each spring being connected to and driving a gear, said gears meshing together so that the film shifting mechanism is driven by a plurality of springs, and means for stopping the shifting mechanism after a predetermined and uniform length of film has been measured.

15. In a device of the class described, a camera for taking a picture on a film, and having a case with an automatic film shifting means mounted therein, measuring rollers adapted to grip and positively hold a film for measuring predetermined, uniform lengths of it, means connected with one of said rollers for stopping the film shifting means after each length is determined and means for releasing these measuring rollers when a film is inserted or removed from the device.

16. In a device of the class described, an automatic film shifting mechanism, measuring rollers adapted to grip a film and be driven by it for measuring predetermined, uniform lengths of it, means connected with one of said rollers for stopping the shifting mechanism after a length of film is determined, a shutter mechanism means connecting said shutter mechanism and said film shifting mechanism for starting said film shifting mechanism and means for releasing these measuring rollers when a film is inserted or removed from the device.

PINCUS BRAUNER.
LOUIS W. ROSEN.

Witnesses:
C. H. STRATTON,
ARTHUR J. McNALLY.